United States Patent
Bertin et al.

(10) Patent No.: US 12,505,247 B2
(45) Date of Patent: Dec. 23, 2025

(54) METHODS AND APPLICATIONS FOR CONTROLLING DISTRIBUTED ACCESS TO A TELECOMMUNICATIONS NETWORK

(71) Applicant: Orange, Paris (FR)

(72) Inventors: Emmanuel Bertin, Châtillon (FR); Julien Hatin, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/104,495

(22) Filed: Nov. 25, 2020

(65) Prior Publication Data

US 2021/0165905 A1    Jun. 3, 2021

(30) Foreign Application Priority Data

Nov. 29, 2019  (FR) ..................................... 1913484

(51) Int. Cl.
| | |
|---|---|
| *H04L 9/32* | (2006.01) |
| *G06F 16/182* | (2019.01) |
| *G06F 21/62* | (2013.01) |
| *H04L 9/08* | (2006.01) |
| *H04L 9/00* | (2022.01) |

(52) U.S. Cl.
CPC ...... *G06F 21/6236* (2013.01); *G06F 16/1824* (2019.01); *G06F 16/1834* (2019.01); *H04L 9/0825* (2013.01); *H04L 9/32* (2013.01); *G06F 2221/2141* (2013.01); *H04L 9/50* (2022.05)

(58) Field of Classification Search
CPC ............. G06F 21/6236; G06F 16/1824; G06F 16/1834; G06F 2221/2141; H04L 9/0825; H04L 9/32; H04L 9/50
See application file for complete search history.

(56) References Cited

U.S. PATENT DOCUMENTS

| | | | |
|---|---|---|---|
| 10,491,376 B1 | 11/2019 | Suthar et al. | |
| 11,222,363 B2* | 1/2022 | Chetlur | G06Q 30/0277 |
| 11,741,247 B2* | 8/2023 | Ciocarlie | G06F 21/62 |
| | | | 713/164 |
| 2017/0244721 A1* | 8/2017 | Kurian | H04L 63/105 |

(Continued)

FOREIGN PATENT DOCUMENTS

EP    3 547 734 A1    10/2019

OTHER PUBLICATIONS

French Search Report dated Jul. 14, 2020 for Application No. 1913484.

(Continued)

*Primary Examiner* — Lynn D Feild
*Assistant Examiner* — Vladimir I Gavrilenko
(74) *Attorney, Agent, or Firm* — Knobbe, Martens, Olson & Bear, LLP (57) ABSTRACT

An access method is described, as well as an access control method implemented by an access application and an access control application registered in a blockchain. The access control application may be subscribed to the events published by the access application. Upon receipt of an access request, the access application publishes in the blockchain, a request to verify a right for the access. It receives a response to the verification request, a response determined by the access control application based on an access control policy defined by this access control application and processes the access request based on this response.

15 Claims, 3 Drawing Sheets

(56) References Cited

U.S. PATENT DOCUMENTS

| | | | |
|---|---|---|---|
| 2019/0095835 A1* | 3/2019 | Jarvis | G06Q 10/06 |
| 2020/0145417 A1* | 5/2020 | Larish | H04L 63/20 |
| 2020/0266997 A1* | 8/2020 | Monica | H04L 9/14 |
| 2020/0401718 A1* | 12/2020 | Hennig | G06F 21/6281 |
| 2021/0004923 A1* | 1/2021 | Mackenzie | G06Q 10/101 |
| 2021/0294913 A1* | 9/2021 | Mackenzie | G06F 21/6218 |
| 2022/0129481 A1* | 4/2022 | Galindo | H04L 9/3297 |

OTHER PUBLICATIONS

Shinsaku, et al., "On blockchain-based authorization architecture for beyond-5G mobile services", 2017 $12^{th}$ International Conference for Internet Technology and Secured Transactions (ICITST), Infonomics Society, Dec. 11, 2017, pp. 136-141.

* cited by examiner

METHODS AND APPLICATIONS FOR CONTROLLING DISTRIBUTED ACCESS TO A TELECOMMUNICATIONS NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 1913484, filed Nov. 29, 2019, the disclosure of which is hereby incorporated by reference in its entirety.

BACKGROUND

Technical Field

The disclosed technology relates to the general field of telecommunications networks, and more specifically to the field of controlling access to a telecommunications network.

Description of Related Technology

In some implementations, the control of access, by a terminal, to a telecommunications network is carried out by controlling, at the time of access to the network by the terminal, cryptographic elements stored in a secure element of the terminal and by verifying that the conditions of this access comply with a profile of the terminal defined by the conditions of a subscription taken out by the owner of the terminal with the operator of the network.

Such a mechanism is difficult to implement when the terminals are no longer objects attached to a user subscribed to services of the operator. This is the case with some connected objects, such as bulbs for example.

Other mechanisms have been proposed to address the issue of control of access, by a terminal, to a network, for example to manage accesses of the terminals of a fleet of mobile terminals of a company. In such a context, the assignment of a terminal to a user is often the responsibility of the company, but the control of access to the network strictly speaking is not changed.

The mechanisms implemented by Mobile Virtual Network Operators (MVNO) include complex solutions to be implemented in which the virtual operator must deploy a specific information system, configured to provision the network of the main operator with the cryptographic material provisioned in the terminals. In such a scheme, the third-party mobile virtual network operator manages the content of user packages but the access to the network remains under the control of the main operator.

These solutions prove to be insufficient.

SUMMARY

The disclosed technology relates to a more flexible access control mechanism than those of the current state of the art Thus, according to a first aspect, the disclosed technology includes an access method implemented by an access application in a communications network including an access network and a network external to the access network, this access application being registered in a blockchain and implemented by a device between the access network and the external network. This method includes:

a step of receiving a request to access the external network, this request including at least one identifier of a terminal attached to the access network and desired connection parameters;

a step of publishing, in the blockchain, a request to verify a right for this access;

a step of receiving a response to this verification request, the response being determined based on a profile defined for this terminal by an access control application registered in the blockchain, this response including an instruction to deny or an instruction to authorize the access with authorized connection parameters; and a step of processing the access request according to these instructions.

Correspondingly, the disclosed technology includes an application for accessing a communications network external to an access network, this application being registered in a blockchain. This application is implemented by a device between the access network and the external network and includes:

a module for receiving a request to access the external network, this request including at least one identifier of a terminal attached to the access network and desired connection parameters;

a module for publishing, in a blockchain, a request to verify a right for this access;

a module for receiving a response to this verification request, the response being determined based on a profile defined for this terminal by an access control application registered in the blockchain, this response including an instruction to deny or an instruction to authorize access with authorized connection parameters; and a module for processing the access request according to these instructions.

According to a second aspect, the disclosed technology includes an access control method implemented by an application for controlling access to a communications network external to an access network, this application being registered in a blockchain, this method including:

a step of detecting a request to verify a right for access of a terminal to said external network, this terminal being attached to the access network, this request including at least one identifier of the terminal and desired connection parameters, this request being published in the blockchain by an application for accessing the network, implemented by a device between the access network and the external network;

a step of determining a response to this verification request based on a profile defined by this access control application for the terminal, this response including an instruction to deny or an instruction to authorize the access with authorized connection parameters; and a step of providing this response to said access application.

Correspondingly, the disclosed technology includes an application for controlling access to a communications network external to an access network, this application being registered in a blockchain and including:

a module for detecting a request to verify a right for access of a terminal to the external network, the terminal being attached to the access network, this request including at least one identifier of the terminal and desired connection parameters, this request being published, in the blockchain, by an application for accessing the network, implemented by a device between the access network and the external network;

a module for determining a response to this verification request based on a profile defined by this access control application for this terminal, this response including an instruction to deny or an instruction to authorize the access with authorized connection parameters; and a module for providing this response to the access application.

Thus, and in general, embodiments of the disclosed technology propose the use of a blockchain to decouple the access control functions and the access functions. The present application is presented in the context of a "blockchain" but the expression "blockchain" is to be understood as covering any type of DLT (Distributed Ledger Technology) whose blockchains strictly speaking constitute a particular element.

As indicated in the document (https://fr.wikipedia.org/wiki/Blockchain), it is recalled that the blockchain technology is a technology of storing and transmitting information without a controller. Technically, it is a distributed database whose information sent by the users and the internal links to the base are verified and grouped at regular time intervals in blocks, the set being secured by cryptography, and thus forming a chain.

By extension, a blockchain is a distributed database that manages a list of recordings protected against falsification or modification by the storage nodes; it is therefore a distributed and secure ledger of all the transactions made since the start of the distributed system.

Blockchains are in particular characterized in that their contents cannot be modified or deleted: information published (that is to say recorded or saved) in a blockchain remains published forever.

Embodiments of the disclosed technology therefore make a fundamental difference between the access functions and the access control functions. As a first approach, it can be considered that the access control function consists essentially in defining an access policy and that the access function consists in applying an access policy.

By using the concepts of the XACML (extensible Access Control Markup Language) specification which defines a language for the access control, the circulation of the rules and the administration of the security policy of the information systems, in one embodiment:

the access can correspond to the decision application point (PEP) which protects the targeted application, in this case the network which the terminal seeks to access; and the access control can correspond to the policy decision point (PDP), where policies are evaluated and compared against the authorization requests.

From a practical point of view, embodiments of the disclosed technology offer a new mechanism in which the access rights are no longer provisioned beforehand in the terminal and in the operator network.

Indeed, in a particular embodiment, the access control application is not operated by the operator of the network protected by embodiments of the disclosed technology but by a third-party. When a terminal wishes to access the operator network, the operator access application publishes that request in the blockchain. This request has the following symbolism: "a terminal wishes to access the network, is there a third-party who wishes to vouch for this access, and if so what would be the conditions for such access?".

The access control application (or the third-party in this case) can for example be:

a module of a merchant society (or sponsor) that wishes for example to temporarily offer a package to its clients;

a module of a MVNO-type mobile virtual network operator that would have purchased, as mentioned above, resources from the operator;

a sign from the user of the terminal, for example an electronic wallet of the user to finance its connectivity.

Nevertheless, the access control application can also be operated by the operator of the network protected by embodiments of the disclosed technology and therefore be a sign from the operator. Embodiments of the disclosed technology, by proposing to decentralize the management of the profiles greatly simplifies the implementation of the profile management entities implemented in current networks, for example the HSS-type entities.

Embodiments of the disclosed technology propose an excessively flexible access control mechanism since it no longer requires a contractual relationship between the user of the terminal and the operator of the network protected by embodiments of the disclosed technology.

The access control mechanism is also very secure, all events being tracked and recorded in a non-repudiable way in the blockchain.

In a particular embodiment, the access method according includes a step of providing a decentralized authorization application, this application being intended to be invoked by the access control application to provide the response to the access right verification request.

In this embodiment, said step of providing a response of the access control method includes an invocation of this decentralized authorization application.

In a particular embodiment, the decentralized authorization application is configured to allow a transaction between an operator of the access control application and an operator of the access application.

This embodiment is particularly advantageous when the access control of a terminal is financed by a third-party since the third-party acknowledges the transaction when it instructs the access application to authorize the access, in a same operation.

In a particular embodiment, the access application records the address of this function in a trusted ledger accessible by the blockchain.

In a particular embodiment, the access request includes a challenge signed by a private key of the terminal, and the access application is configured to:

communicate this challenge in the access right verification request so that it is verified by the access control application;

or verify itself the challenge with a public key of the terminal if this key is comprised in said access request, the step of publishing the right verification request being implemented only in case of a positive verification of the challenge.

The second option allows the user to ensure that he receives an access request of a valid terminal before publishing the access request to the blockchain. It consequently allows protecting the blockchain from DoS-type attacks.

In a particular embodiment of the control method, the profile of the terminal is obtained by instantiation of a profile model defined by an operator of the access application.

This embodiment allows guaranteeing that the profile complies with a general policy of the operator represented by this model.

Embodiments of the disclosed technology also relate to a computer program on a recording medium, this program being likely to be implemented in a computer. This program includes instructions adapted to the implementation of an access method as described above.

Embodiments of the disclosed technology also relate to a computer program on a recording medium, this program being likely to be implemented in a computer. This program includes instructions adapted to the implementation of an access control method as described above.

Each of these programs can use any programming language, and be in the form of source code, object code, or intermediate code between source code and object code, such as in a partially compiled form, or in any other desirable form.

Embodiments of the disclosed technology also relate to an information medium or a recording medium readable by a computer, and including instructions of the first or of the second or of the third computer program as mentioned above.

The information or recording media can be any entity or device capable of storing the programs. For example, the media can include a storage means, such as a ROM, for example a CD ROM or a microelectronic circuit ROM, or a magnetic recording means, for example a floppy disk or a hard disk or flash memory.

On the other hand, the information or recording media can be transmissible media such as an electrical or optical signal, which can be routed via an electrical or optical cable, by radio link, by wireless optical link or by other means.

The programs can be particularly downloaded from an Internet-type network.

Alternatively, each information or recording medium can be an integrated circuit in which a program is incorporated, the circuit being adapted to execute or to be used in the execution of one of the methods.

BRIEF DESCRIPTION OF THE DRAWINGS

Other characteristics and advantages of the disclosed technology will emerge from the description given below, with reference to the appended drawings which illustrate an exemplary embodiment thereof without any limitation. In the figures.

DETAILED DESCRIPTION

Figure 1:
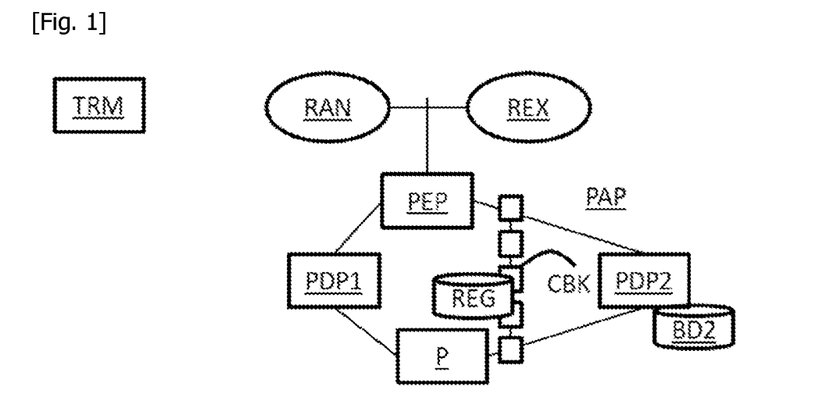
FIG. 1 represents an access application and an access control application according to a particular embodiment in their environment.

FIG. 1 represents a terminal TRM, an external network REX and a mobile access network RAN via which the terminal TRM can access the external network REX.

FIG. 1 also represents:
a first access control application PDP1 and a second access control application PDP2, according to particular embodiments, each configured to define a policy for controlling access to the external network REX, these policies may be similar or different; and
an access application PEP according to a particular embodiment configured to apply an access control policy, for example decided by the application PDP1 or by the application PDP2.

PPEP refers to a device implementing an access application PEP and PPDP refers to a device implementing an access control application PDP.

In the embodiment described here, the devices PPEP and PPDP are peer devices.

In the embodiment described here, these applications PEP, PDP1 and PDP2 are decentralized dApp-type applications implemented by peers of a peer-to-peer network PAP. In the embodiment described here, the peer network PAP includes other general reference peers P. It will be recalled that a dApps is a decentralized function which operates on a peer-to-peer network. This application is in the form of executable code.

The peer device PPEP is between the access network RAN and the external network REX. For example, the peer device PPEP is in a flow cut-off between the access network RAN and the external network REX.

In the embodiment described here, the access application PEP is operated by a telecommunications service operator OPP.

In the embodiment described here, the access control application PDP1 is operated by a third-party OPS.

In the exemplary embodiment described here, the third-party OPS is a mobile operator who has purchased resources from the operator OPP. In order to distinguish it from the secondary operator OPS, the operator OPP will sometimes be referred to as "main operator" OPP. When the term "operator" is used without specifying whether it is the "main" operator OPP or the "secondary" operator OPS, it should be understood that it is the operator OPP that operates the access application PEP.

In the embodiment described here, the access control module application PDP2 is operated by a GAL company that wishes to provide some of its clients with network services.

These embodiments are not limiting, an access control application according to an embodiment of the disclosed technology can be operated by the operator OPP.

In the exemplary embodiment described here, the operator OPP defines one or more profile models MOD which can be used by an access control application, for example PDP1 or PDP2, to define an access profile for a given user.

These profile models are optional. They guarantee that an access control policy defined from such a data structure is acceptable to the operator OPP.

Figure 2A:
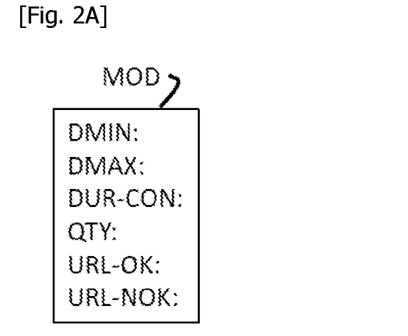
FIG. 2A represents a profile model which can be used in a particular embodiment.

FIG. 2A represents an example MOD of such a profile model. It allows specifying the following connection parameters:
minimum flow rate DMIN;
maximum flow rate DMAX;
duration of a connectivity period DUR-CON;
authorized amount of data QTY;
authorized URL addresses URL-OK
prohibited URL addresses URL-NOK.

It is assumed that the applications PEP, PDP1, PDP2 are registered in a blockchain CBK, each with an identifier in the chain, respectively ID_PEP, ID_PDP1, ID_PDP2.

The public key of a device A in the blockchain CBK will be called KPUB_CBK(A) and the associated private key kept secret by this device will be called KPRV_CBK(A).

FIG. 1 also represents a trusted ledger REG. In the exemplary embodiment described here, this trusted ledger REG is shared within the blockchain CBK.

In the exemplary embodiment described here, the trusted ledger REG is operated by a regulatory body, for example ARCEP (Regulatory Authority for Electronic Communications, Posts and Press Distribution) in France.

In another embodiment, the trusted ledger can be implemented in the form of a decentralized dApp-type application (SmartContract). It is recalled that a smart contract is, in the context of blockchain mechanisms, a computer program able to carry out token transactions under certain conditions.

In one embodiment, a recording in the trusted ledger may be the subject of a financial transaction.

In the embodiment described here, the access application PEP provides a decentralized authorization application dAPP_AUT, which can be invoked by an access control application PDPi to request the access application PEP to validate or to deny the access to the external network REX, for a terminal TRM and for given connection parameters.

This application dAPP_AUT can be a dApps within the meaning of the blockchain technology.

In the exemplary embodiment described here, the authorization function dAPP_AUT is implemented in a peer P of the peer network PAP.

Figure 3:
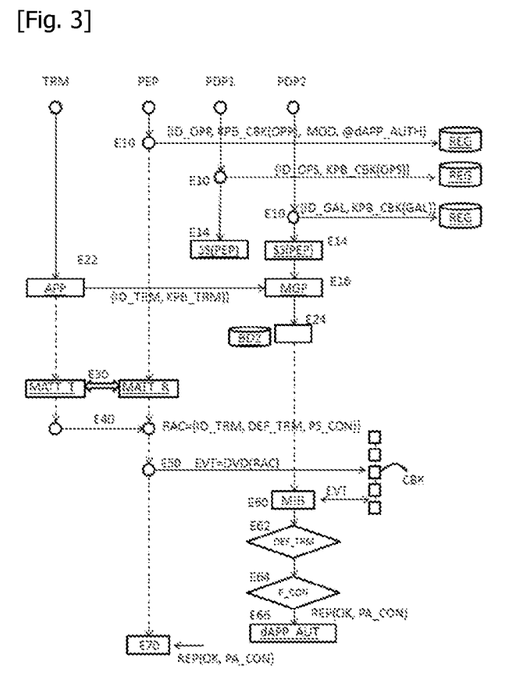
FIG. 3 represents in flowchart form the main steps of an access method and the main steps of an access control method.

With reference to FIG. 3, during a step E10, each of the applications PEP, PDP1 and PDP2 records, in the trusted ledger REG, its identifier in the blockchain CBK and its public key in the blockchain and possibly other information.

Thus, in the particular embodiment described here:
the access application PEP records, in the trusted ledger REG, its identifier ID_OPP, its public key KPB_CBK(OPP), the profile model MOD and the address of the decentralized authorization application dAPP_AUT;
the access control application PDP1 records, in the trusted ledger REG, its identifier ID_OPS and its public key KPB_CBK(OPS), and
the access control application PDP2 records, in the trusted ledger REG, its identifier ID_GAL and its public key KPB_CBK(GAL).

During a step E14, each of the access control applications PDP1, PDP2 subscribes to the events published by the access application PEP.

This subscription step E14 can comprise the positioning of a filter corresponding to the public key KPB_CBK(OPP) of the operator in the blockchain so as to filter the messages published by the operator OPP on the blockchain CBK.

Figure 4A:
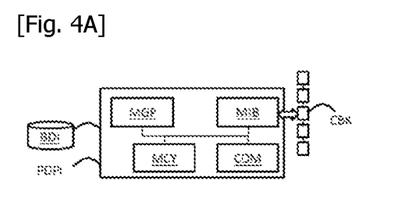
FIG. 4A represents the software architecture of an access control application according to a particular embodiment.

In this embodiment and as presented more specifically with reference to FIG. 4A, each of the access control applications PDPi includes an interface module MIB with the blockchain CBK for this purpose.

It is now assumed that the GAL company wishes to provide the user of the terminal TRM with some services of the operator OPP.

In the embodiment described here, the access control application PDP2 which defines the access control policy of the company GAL obtains the profile model MOD recorded in the ledger REG and creates (step E24) an instance MOD(TRM) of this template to define a profile including the rights for access of the user of the terminal TRM to the external network REX.

In the described exemplary embodiment, this instantiation step is performed by a module MGP for managing profiles of the application PDP2 represented in FIG. 4A.

Figure 2B:
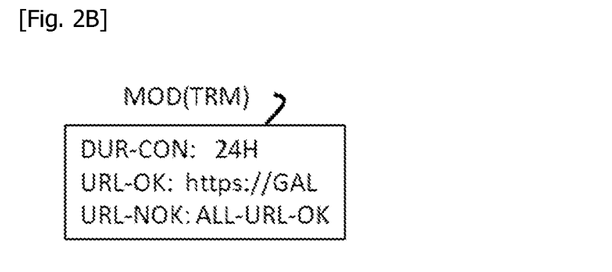
FIG. 2B represents a user profile obtained by instantiation of the model of FIG. 2A.

In this example, it is assumed that the GAL company wishes to allow this user to access the http://GAL URL website for a period of 48 hours from the first access to this site. The instance MOD(TRM) of the model corresponding to these connection parameters is represented in FIG. 2B. It is recorded in a database BD2 managed by the access control application PDP2.

The instance MOD(TRM) constitutes a profile for accessing the external network REX for the terminal TRM which is compatible with the general policy defined by the operator OPP since it corresponds to the model MOD defined by the operator OPP.

Figure 4B:
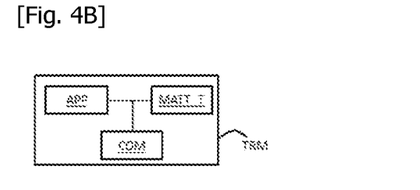
FIG. 4B represents the functional architecture of a terminal.

In the embodiment described here, and as described later with reference to FIG. 4B, the terminal TRM of the user includes an application APP configured to generate a pair (KPB(TRM), KPRIV(TRM)) of compatible public/private keys and to record these keys in a memory of the terminal TRM.

In the embodiment described here, the terminal TRM is configured to communicate its identifier ID_TRM and its public key KPB(TRM) to the application PDP2, for example during a step E22 in the example of FIG. 3.

In the example of FIG. 3, these data are received during a step E16 by the profile management module MGP of the access control application PDP2.

It is assumed, still in the example of FIG. 3, that the access control application PDP2 records, in its database BD2, the identifier ID_TRM and the public key KPB(TRM) of the user at the time (step E24) of recording of the instance MOD(TRM).

These recordings can also be made independently of each other, as long as the access control application PDP2 is able to constitute in its database BD2, a recording including:
the identifier ID_TRM of the user
his public key KPB(TRM), and
his profile MOD(TRM) defining its rights for access to the external network REX.

It is now assumed that the user of the terminal TRM wishes to use the mobile application APP to access the http://GAL website of the GAL company.

In the embodiment described here, the terminal includes a module MATT_T allowing it to attach to the access network RAN of the operator; this attachment module MATT_T does not allow the terminal TRM to access the external network EXT.

More specifically, in the embodiment described here, this module MATT_T is configured to implement the exchanges of a procedure for attaching to the access network RAN referenced E30 in FIG. 3, these exchanges ending with the receipt of an IP address by the terminal TRM. This procedure is in accordance with other implementations.

In the exemplary embodiment described here, the module of the access application PEP which participates in this attachment is referenced MATT_R.

In one embodiment described here, and as detailed later with reference to FIG. 4C, the access application PEP includes an access control gateway PCA configured to provide the IP address to the terminal TRM, via the attachment module MATT_R, as part of the attachment procedure.

In the embodiment described here, the access control gateway PCA is implemented in a P-Gateway of the operator but it can be implemented in other equipment, for example downstream in the flow path.

Once the terminal TRM is attached to the network, the mobile application APP sends, as in other implementations, a request RAC to access the external network REX (step E40). This request RAC includes for example the identifier ID_TRM of the terminal, a challenge DEF_TRM signed by the private key KPRIV(TRM) of the terminal and desired connection parameters PS_CON.

This access request uses the IP address provided by the access control gateway PCA. It can be of any type, for example of HTTP type in the example of access to the http://GAL site, but also for example of SIP type for a voice over IP call.

The access request RAC is received by the access control gateway PCA during this same step E40. This gateway PCA consequently constitutes an example of a module for receiving an access request within the meaning of the disclosed technology.

Upon receipt of this access request RAC, the application PEP publishes in the blockchain CBK a request DVD(RAC) to verify the right for said access (step E50). In the embodiment described here, this request includes at least the identifier ID_TRM of the terminal, the desired connection parameters PS_CON and the public key KPB_PUB(OPP) of the operator OPP.

In an alternative embodiment, the request to verify the right for said access also includes a challenge DEF_TRM signed by the private key KPRIV(TRM) of the terminal so that it is verified by the access control application.

Figure 4C:
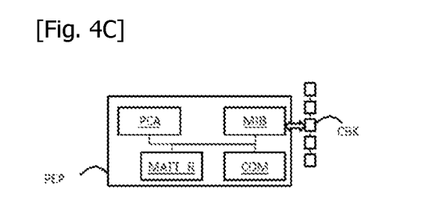
FIG. 4C represents the software architecture of an access control application according to a particular embodiment.

In the embodiment described here, and as represented in FIG. 4C, the access application PEP includes an interface module MIB with the blockchain CBK, this module MIB being configured to be able to publish the request DVD (RAC).

In a first embodiment, in order to perform this publication, this interface module MIB sends an event EVT in the blockchain CBK. This event is detected by the interface module MIB with the blockchain CBK of the access control application PDP2, which in this example is configured to filter all the events published by the operator OPP based on the public key KPB_CBK(OPP). The interface module MIB of the access control application PDP2 constitutes a particular example of a module for detecting a verification request within the meaning of the disclosed technology.

In another embodiment, the interface module MIB of the access application PEP performs this publication by invoking a decentralized dAPP-type application in the blockchain CBK.

In the embodiment described with reference to FIG. 3, the access control application PDP2 detects the event EVT, or more generally, the publication of the request to verify a right for access in the blockchain CBK during a step E60.

During a step E62, the access control application PDP2 obtains the identifier ID_TRM of the terminal TRM at the origin of the access request RAC of step E40 and uses the public key KPB(TRM) of this terminal to verify the challenge DEF_TRM comprised in the access request in case where this challenge is comprised in the right verification request.

In the embodiment described here, and as represented in FIG. 4A, the access control application PDP2 includes a cryptographic module MCY for this purpose.

The challenge in this example having been signed with the private key KPRIV(TRM) of the terminal TRM, this challenge is validated.

In this embodiment, the access control gateway PCA of the operator does not perform verification on the terminal TRM before publishing (in step E50) the access request in the blockchain CBK. As a variant, the terminal TRM sends its public key KPB(TRM) in its access request RAC (at step E40) and the access control gateway PCA verifies that the challenge has been duly signed before publishing the request in the blockchain.

The challenge having been validated by the access control application PDP2, the latter verifies whether the desired connection parameters PS_CON defined by the terminal TRM comply with the profile MOD(TRM) of this terminal.

In the exemplary embodiment described with reference to FIG. 3, this verification is performed during a step E64 by the profile management module MGP of the access control application PDP2.

In the embodiment described here, the access control application PDP2 determines a response REP to said access right verification request, said response including:
  either a denial instruction,
  or an access authorization instruction with authorized connection parameters PA_CON, identical or different from the desired connection parameters PS_CON.

In the exemplary embodiment described here, the desired connection parameters PS_CON comply with the profile MOD(TRM) of the terminal, and the response from the access control application PDP2 includes an instruction to authorize the access with authorized connection parameters PA_CON identical to the desired connection parameters PS_CON.

The cryptographic module CRY and the profile management module MGP together constitute a particular exemplary embodiment of a response determination module within the meaning of the disclosed technology.

In the embodiment described here, the access control application PDP2 provides the response REP during a step E66 by invoking the decentralized authorization application dApp_AUT provided by the operator OPP.

In the embodiment described here, the invocation of the decentralized application dApp_AUT is performed by the interface module MIB with the blockchain CBK of the access control application PDP2. This function is invoked with at least the authorized connection parameters PA_CON as parameters. This interface module MIB constitutes an example of a response provider module within the meaning of the disclosed technology.

In the embodiment described here, this application dAPP_AUT allows, at the same time as it requests the operator OPP to authorize an access, carrying out a transaction between the GAL company and the operator OPP so that the GAL company supports the payment of this access to the network by the terminal TRM. This transaction can be carried out by a token transfer.

In the example described here, only the access control application PDP2 responded (step E66) to the access request published by the access application PEP in step E50. In another example, several access control applications could respond, for example the access control application PDP1 if the user of the terminal TRM had taken out a subscription with the secondary operator OPS.

With reference to FIG. 3, the access control gateway PCA of the access application PEP receives during a step E70 the instruction given by the access control application PDP2 to authorize the access to the terminal with the authorized connection parameters PA_CON. It processes the access request in accordance with these instructions during this same step. The access control gateway is therefore a module for processing an access request within the meaning of the disclosed technology.

In accordance with the instructions, the access control gateway authorizes the terminal TRM to access the https:// GAL website for 48 hours.

In one embodiment, the access control gateway PCA of the access application PEP publishes all the access requests RAC it receives (step E40) in the blockchain (step E50).

In another embodiment, the access control gateway PCA is configured to locally verify whether the access conditions of a terminal TRM are valid before publishing an access request. For example, in the example described here, the control gateway PCA is adapted to allow the terminal TRM to access the http://GAL site for 48 hours. During this period of time, the access application PEP allows the requests to access the website: the publication step E50 is not implemented.

The access control gateway PCA can optionally perform an address translation function between the access network RAN and the external network REX.

Figure 5:
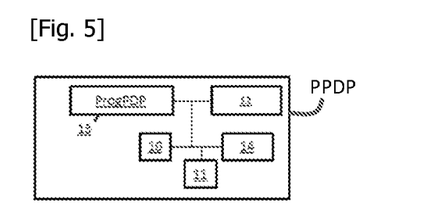
FIG. 5 represents the hardware architecture of a peer device implementing an access control application according to a particular embodiment.

FIG. 5 represents the hardware architecture of a PPDP peer implementing an access control application PDP. In the embodiment described here, this peer has the hardware architecture of a computer. It comprises in particular a processor 10, a random access memory 11, a read-only memory 12, a non-volatile flash memory 13 and communication means 14. Such means are not described in more detail here.

The read-only memory 12 constitutes a recording medium, readable by processor 10 and on which a computer program ProgPDP is recorded here, this program including instructions allowing in particular, when they are executed by the processor 10:
- to record an identifier and a public key of the access control application in the ledger REG, as in step E10;
- to subscribe to the blockchain in order to detect the events published by an access application, as in step E14;
- to define an access profile for a terminal, as in steps E16 and E24;
- to detect a request published by this access application in the blockchain, this request being consecutive to the receipt by this access application of a request sent, by a terminal, to access the network with some conditions;
- to verify whether these conditions comply with the access profile of this terminal; and
- to invoke a decentralized authorization application to request the access application to authorize or deny the access to the network by this terminal depending on the result of this verification.

Figure 6:
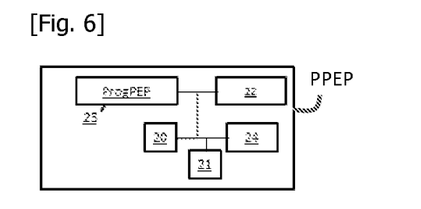
FIG. 6 represents the hardware architecture of a peer device implementing an access application according to a particular embodiment.

FIG. 6 represents the hardware architecture of a PPEP peer implementing an access application PEP. In the embodiment described here, this peer has the hardware architecture of a computer. It comprises in particular a processor 20, a random access memory 21, a read-only memory 22, a non-volatile flash memory 23 and communication means 24. Such means are not described in more detail here.

The read-only memory 22 constitutes a recording medium, readable by processor 20 and on which a computer program ProgPEP is recorded here, this program including in particular instructions allowing in particular, when they are executed by the processor 20:
- to record, in the ledger REG, an identifier and a public key of this access application, a data structure MOD representative of a general policy of the operator, and the address of a decentralized authorization application dAPP_AUT as in step E10,
- to attach a terminal to the network, then receive requests from this terminal to access the external network as in steps E30 and E40;
- to publish these access requests in the blockchain as in step E50, either systematically or after having verified that the access conditions are no longer met, and
- to authorize or deny the access to the network based on a response sent by an access control application.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access method implemented by an access application in a communications network including an access network and a communication network external to the access network, wherein the method comprises:
   receiving, by an access application registered in a blockchain and implemented by a device between the access network and the external communication network, a request to access the external communication network, the device comprising a processor and a memory, the request including at least one identifier of a terminal attached to the access network and desired connection parameters;
   publishing, by the access application registered in the blockchain and implemented by the device between the access network and the external communication network, in the blockchain, a verification request, the verification request configured to trigger a separate access control application registered in the blockchain to:
      verify a right for the access to the external communication network, the verification of the right for the access to the external communication network based on a profile defined for the terminal by the access control application registered in the blockchain; and
      determine, based on the profile defined for this terminal by the access control application registered in the blockchain, a response to the verification request to verify the right for the access to the external network, the response including an instruction to the access application to deny or an instruction to the access application to authorize the access to the external communication network with authorized connection parameters;
   receiving, by the access application registered in the blockchain and implemented by the device between the access network and the external communication network, the response to the verification request to verify the right for the access to the external communication network; and processing, by the access application registered in the blockchain and implemented by the device between the access network and the external communication network, the access request according to the instruction determined by the access control application registered in the blockchain.

2. The access method of claim 1, wherein the access application registered in the blockchain and implemented by the device between the access network and the external communication network provides a decentralized authorization application, the decentralized authorization application being intended to be invoked by the access control application registered in the blockchain to provide the response.

3. The access method of claim 1 wherein the access request includes a challenge signed by a private key of the terminal, the access application being configured to:
    communicate the challenge in the access right verification request so that it is verified by the access control application; or
    verify the challenge with a public key of the terminal upon a determination that the key is comprised in the access request, wherein the publishing the right verification request only occurs in response to a positive verification of the challenge.

4. The method of claim 1, wherein the response to the verification request to verify the right for the access to the external communication network is published in the blockchain at the command of the application for controlling access to the communication network external to the access network.

5. The method of claim 1, wherein each of the access application and the access control application comprise executable code, and wherein the access application is registered in the blockchain separate from the access control application.

6. The method of claim 1, wherein the verification request is further configured to trigger the separate access control application registered in the blockchain to, after determining the response to the verification request to verify the right for the access to the external network, cause the determined response to be sent to the access application.

7. The method of claim 6, wherein the verification request is further configured to trigger the separate access control application registered in the blockchain to cause the determined response to be sent to the access application by invoking a decentralized authorization application.

8. The method of claim 7, wherein the decentralized authorization application is configured to allow a transaction between an operator of the access control application and an operator of the access application.

9. The method of claim 1, wherein the request to access the external communication network comprises a request to access an external telecommunication network.

10. A non-transitory computer readable medium having stored thereon instructions, which when executed by a processor, cause the processor to implement a method comprising:
    receiving, by an access application registered in a blockchain and implemented by a device between an access network and a communication network external to the access network, the device comprising a processor and a memory, a request to access the external communication network, the request including at least one identifier of a terminal attached to the access network and desired connection parameters;
    publishing, by the access application registered in the blockchain and implemented by the device between the access network and the external communication network, in the blockchain, a verification request, the verification request configured to trigger a separate access control application registered in the blockchain to:
        verify a right for the access to the external communication network, the verification of the right for the access to the external communication network based on a profile defined for the terminal by the access control application registered in the blockchain; and
        determine, based on the profile defined for this terminal by the access control application registered in the blockchain, a response to the verification request to verify the right for the access to the external network, the response including an instruction to the access application to deny or an instruction to the access application to authorize the access to the external communication network with authorized connection parameters;
    receiving, by the access application registered in the blockchain and implemented by the device between the access network and the external communication network, the response to the verification request to verify the right for the access to the external communication network; and
    processing, by the access application registered in the blockchain and implemented by the device between the access network and the external communication network, the access request according to the instruction determined by an access control application registered in the blockchain.

11. An access control method implemented by an application for controlling access to a communication network external to an access network, this application being registered in a blockchain, wherein the method comprises:
    detecting, by the application for controlling access to the communication network external to the access network, this application being registered in the blockchain, a request to verify a right for access of a terminal to the external communication network, the terminal being attached to the access network, the request including at least one identifier of the terminal and desired connection parameters to the external communication network, wherein the request is published in the blockchain by a separate access application for accessing the external communication network, implemented by a device between the access network and the external communication network, the device comprising a processor and a memory;
    determining, by the application for controlling access to the communication network external to the access network, a response to the request based on a profile defined for the terminal by the application for the terminal, the response including an instruction to the access application to deny or an instruction to the access application to authorize the access with authorized connection parameters; and
    providing the response to said access application for accessing said external communication network, the response configured to trigger the access application to, upon receipt of the response by the access application, process the access request according to the instruction determined by the application for controlling access to the communication network external to the access network.

12. The access control method of claim 11, wherein providing a response includes an invocation of a decentralized authorization application.

13. The access control method of claim 12, wherein the decentralized authorization application is configured to allow a transaction between an operator of the access control application and an operator of said access application for accessing said external communication network.

14. The access control method of claim 12, wherein the profile of the terminal is obtained by instantiation of a profile model defined by an operator of said access application for accessing said external communication network.

15. A non-transitory computer readable medium having stored thereon instructions, which when executed by a processor, cause the processor to implement a method comprising:
   detecting, by the application for controlling access to the communication network external to the access network, this application being registered in the blockchain, a request to verify a right for access of a terminal to the external communication network, the terminal being attached to the access network, the request including at least one identifier of the terminal and desired connection parameters to the external communication network, wherein the request is published in the blockchain by a separate access application for accessing the external communication network, implemented by a device between the access network and the external communication network, the device comprising a processor and a memory;
   determining, by the application for controlling access to the communication network external to the access network, a response to the request based on a profile defined for the terminal by the application for controlling access to the communication network external to the access network, the response including an instruction to the access application to deny or an instruction to the access application to authorize the access with authorized connection parameters; and
   providing the response to said access application for accessing said external communication network, the response configured to trigger the access application to, upon receipt of the response by the access application, process the access request according to the instruction determined by the application for controlling access to the communication network external to the access network.

* * * * *